June 12, 1956  V. A. AGOSTINI ET AL  2,750,088
GUN RACK
Filed July 31, 1953  2 Sheets-Sheet 1
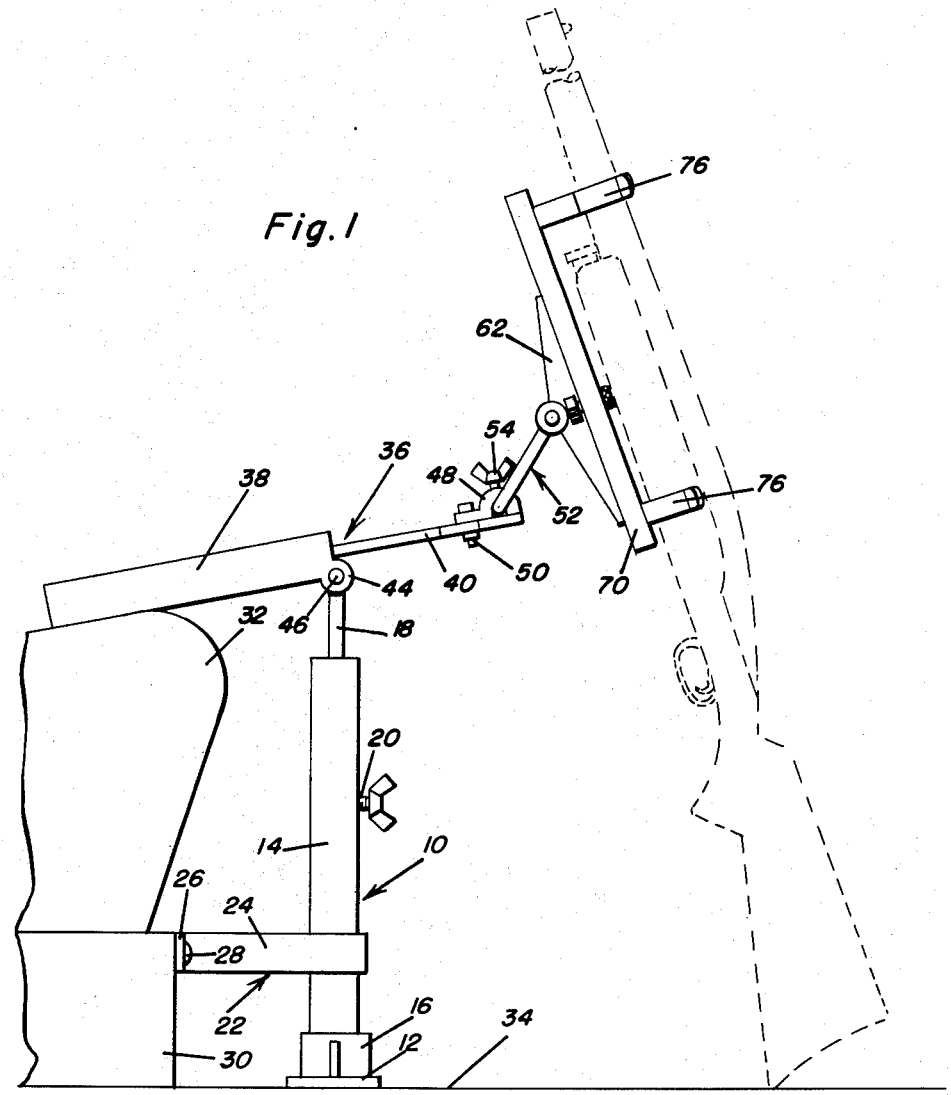
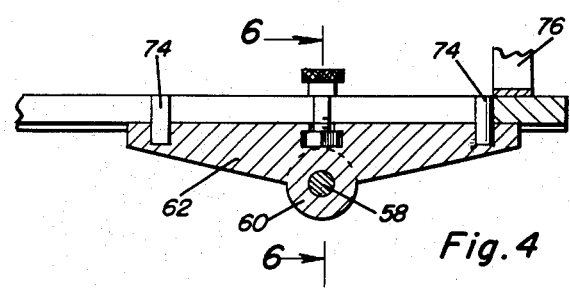
Victor A. Agostini
James Ray Winters
INVENTORS June 12, 1956  V. A. AGOSTINI ET AL  2,750,088
GUN RACK
Filed July 31, 1953  2 Sheets-Sheet 2
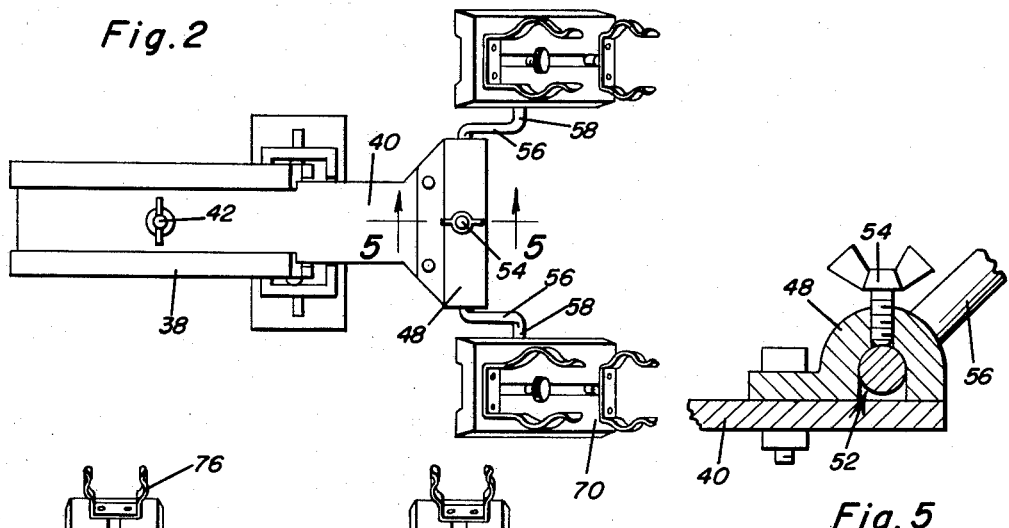
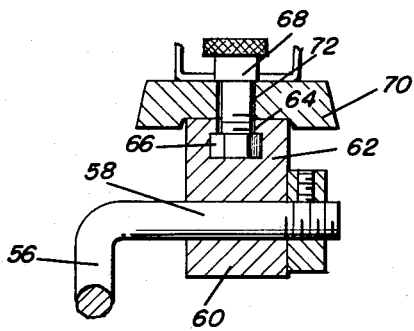
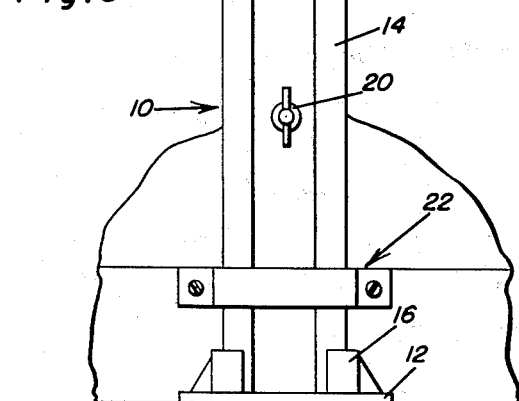
Victor A. Agostini
James Ray Winters
INVENTORS.

United States Patent Office 2,750,088
Patented June 12, 1956

2,750,088

GUN RACK

Victor A. Agostini, Bennington, and James Ray Winters, Addison, Vt.

Application July 31, 1953, Serial No. 371,618

6 Claims. (Cl. 224—1)

This invention relates generally to an improved form of gun rack particularly adapted for use in automobiles and the like.

The primary object of this invention is to provide an improved form of gun rack which is readily attached to a vehicle so that rifles may be safely carried therein while at the same time being readily accessible for use.

Another object of this invention resides in the provision of an improved form of gun rack for use in automobiles and the like which incorporates a fixed base member and a supporting assembly pivotally secured thereto, the supporting assembly extending rearwardly of the base and adapted to overlie and rest upon a vehicle seat while the forward portion of the support assembly is provided with means providing a rest for the upper portion of a rifle or the like.

Still another object of this invention resides in the provision of an improved form of gun rack for use in automobiles and the like for protecting the sights of a gun during transportation and preventing the same from becoming damaged or misaligned.

Still another object of this invention is to provide a gun rack in conformity with the foregoing objects which includes means for adjusting its various component parts so that rifles, shotguns and the like of all sizes and shapes may be readily carried by the rack in a safe and readily accessible position within a vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view showing the gun rack positioned within a vehicle and showing a firearm supported thereby in dotted lines;

Figure 2 is a plan view of the assembly shown in Figure 1;

Figure 3 is a front elevational view of the assembly shown in Figure 1;

Figure 4 is a vertical section taken substantially along the plane of section line 4—4 of Figure 3 showing details of one of the support plate assemblies;

Figure 5 is an enlarged vertical section taken substantially along the plane of section line 5—5 of Figure 2 showing the crank adjusting means; and Figure 6 is an enlarged vertical section taken substantially along the plane of section line 6—6 of Figure 4.

Referring now more particularly to Figure 1, reference numeral 10 indicates generally the base portion of the gun rack assembly which includes the base plate 12 and a standard member 14 secured at its lower end thereto in vertically upstanding relation, the lower end of the standard being preferably received in the sleeve 16 rigidly secured to the base plate 12. The standard is generally of C-shaped cross-section and telescopically receives therein an upper section 18 which is provided in the intermediate portion with a threaded aperture receiving the wing-type screw member 20 by means of which the upper section 18 may be adjustably secured to the standard 14 in various extended positions, see particularly Figures 2 and 3. A bracket assembly 22 of generally U-shaped configuration has its intermediate or bight portion rigidly secured to the standard 14 and the leg portions 24 thereof extend rearwardly therefrom and terminate in the laterally offset ears 26 which receive the fastening members 28 by means of which the aforementioned assembly is rigidly secured to the lower portion 30 of the vehicle seat assembly which includes the removable upper or cushion section 32 as is conventional. The base plate 12 is, of course, adapted to rest upon the vehicle floor board 34.

The support assembly is indicated generally by the reference character 36 and includes the rear section 38 of C-shaped cross-section which telescopically receives the forward section 40, which latter section is provided with the lock screw member 42 for securement to the rearward section 38 in various extended positions with relation thereto. The forward end of the rearward section 38 is provided with the depending boss portion 44 which receives the pivot pin 46 by means of which this section is pivotally secured to the upper member 18 of the base assembly. The forward end of the extensible section 40 is provided with an arcuate strap member 48 secured thereto, as by the fastening element 50 and which is adapted to receive an intermediate portion of the crank assembly indicated generally by the reference character 52 in its arcuate recess, as will be readily apparent. A set screw 54 extends through the arcuate member into engagement with the crank for maintaining the same in various selected angular positions thereon, for a purpose presently apparent.

Opposite ends of the crank assembly are provided with the right angularly bent leg portions 56 which are provided at their free ends with the horizontal arms 58 rotatably received in the bosses 60 of the members 62. The members 62 are provided on their upper surface with the T-shaped grooves 64 for receiving the nut and screw assemblies 66 and 68, respectively. Elongated plate members 70 are provided with the longitudinally extending slots 72 receiving the screws 68 in the manner shown, and the spaced pins 74 on the upper surface of the members 62 are also received in these slots so as to guide the plates 70 in proper position on the members 62 for selected sliding movement by manipulation of the screw members 68, which will be readily apparent.

Each of the plates 70 is provided with a pair of spaced clip members 76 which are of U-shaped configuration with their bight portions rigidly secured to the plates, the clips being adapted to receive the upper portion of a firearm, such as a rifle, shotgun or the like. In this respect, it will be noted that the upper clip may be so formed as to readily grasp the barrel portion of a firearm while the lower clip is formed to grasp the larger upper hand grip portion thereof.

It will be noted that the portion 38 of the support assembly 36 embodies substantial weight so that it will tend to counterbalance any forces on the forward portion of the support assembly, always lying or resting upon the vehicle seat 32. The crank assembly 52 may be manipulated to any desired rotated position with respect to the forward section 40 of the support assembly 36 by manipulation of the set screw 54 so that the plate member assemblies are disposed at the proper height while further height adjustment of these plates is effected by manipulation of their associated screw members 68 whereby the plates may be slid longitudinally of the members 62, thus accommodating firearms of different makes, shapes and sizes. It will be manifest that the rack will properly support the firearm whose butt end rests upon the vehicle floor board, the positioning of the firearms being such that their direction of fire is directed upwardly to provide a maximum of safety while at the same time, the clip members 76 only lightly engage the firearms and act more as a support rather than clip members for grasping the firearms, the latter being sustained in inclined position as indicated in dotted lines in Figure 1 so that only a small portion of their weight is supported by the rack assembly. It will be obvious that the firearms are easily removed from the rack when it is desired to use them, and the proper inclination of the firearms within the confines of the vehicle is effected by manipulation of the forward section 40 of the support assembly telescopically or extensibly within the rearward section 38 whereas the proper height of the support assembly 36 with respect to the seat 32 is effected through extensibility of the upper section 18 of the base assembly 10, thus accommodating the rack to all the various makes and types of vehicles with which it is desired to be used.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A gun rack comprising a base adapted to be positioned on the floor of an automobile, a standard disposed on said base, said standard including an extensible upper section, a support member, said support member including a rear section adapted to rest upon an automobile and a forward section extensibly carried by said rear section and projecting from the forward end thereof, a pivot pin pivotally connecting the forward end of said support member to the upper free end of said extensible upper section, means on the latter section for supporting the upper portion of firearms.

2. The combination of claim 1 wherein said means includes a support plate pivotally carried by the free end of said forward section, clips carried by said plate for receiving a firearm.

3. The combination of claim 1 wherein said means includes a support plate, a crank pivotally securing said plate to said forward section.

4. The combination of claim 3 wherein means are provided for securing said crank in selected angular positions.

5. A gun rack comprising a vertically extensible base member adapted to be positioned on a vehicle floor board, a support member including a rear section and a forward section projecting forwardly therefrom and extensibly carried thereby, said rear section being pivotally secured at its forward end to the upper end of said base member, and a support plate pivotally carried by the free end of said forward section, said plate having clips for receiving the upper portion of a rifle.

6. The combination of claim 5 wherein a crank pivotally connects the support plate to the forward member, said crank being secured to the free end of said forward member in selected angular positions.

References Cited in the file of this patent

UNITED STATES PATENTS

| | | |
|---|---|---|
| 125,743 | Lehnert | Apr. 16, 1872 |
| 185,004 | White | Dec. 5, 1876 |
| 835,678 | Hammond | Nov. 13, 1906 |
| 1,537,772 | Hitzler | Mar. 12, 1925 |
| 2,692,069 | Winters et al. | Oct. 19, 1954 |